United States Patent
Zierer et al.

(10) Patent No.: US 7,795,357 B2
(45) Date of Patent: Sep. 14, 2010

(54) POLYOXYMETHYLENE MULTI-BLOCK COPOLYMERS, THEIR PRODUCTION AND USE

(75) Inventors: Dirk Zierer, Hofheim (DE); Klaus Kurz, Kelsterbach (DE); Jens Schiebisch, Freigericht (DE); Karl-Friedrich Mück, Wiesbaden (DE); Holger Schmalz, Bayreuth (DE)

(73) Assignee: Ticona GmbH, Kelsterbach (DE)

( * ) Notice: Subject to any disclaimer, the term of this patent is extended or adjusted under 35 U.S.C. 154(b) by 989 days.

(21) Appl. No.: 10/570,643

(22) PCT Filed: Sep. 3, 2004

(86) PCT No.: PCT/EP2004/009810

§ 371 (c)(1),
(2), (4) Date: Mar. 30, 2006

(87) PCT Pub. No.: WO2005/023897

PCT Pub. Date: Mar. 17, 2005

(65) Prior Publication Data

US 2006/0160938 A1 Jul. 20, 2006

(30) Foreign Application Priority Data

Sep. 5, 2003 (DE) ................. 103 40 976

(51) Int. Cl.
*C08L 59/00* (2006.01)
*C08L 59/04* (2006.01)
*C08G 2/38* (2006.01)

(52) U.S. Cl. .................. 525/398; 525/58; 525/146; 525/148; 525/154; 525/399; 525/400; 525/401; 525/411; 525/465; 528/153; 528/250

(58) Field of Classification Search .............. None
See application file for complete search history.

(56) References Cited

U.S. PATENT DOCUMENTS

| | | | |
|---|---|---|---|
| 3,254,053 A | 5/1966 | Fisher et al. | |
| 3,364,157 A * | 1/1968 | Halek et al. | 525/54.22 |
| 3,505,292 A * | 4/1970 | Smith | 525/410 |
| 3,642,942 A | 2/1972 | Castner et al. | |
| 4,072,704 A | 2/1978 | Langdon | |
| 4,267,303 A | 5/1981 | König et al. | |
| 4,535,127 A | 8/1985 | Matsuzaki et al. | |
| 4,808,689 A | 2/1989 | Katz | |
| 5,306,769 A | 4/1994 | Sone et al. | |
| 2002/0016395 A1 | 2/2002 | Niino et al. | |

FOREIGN PATENT DOCUMENTS

| | | |
|---|---|---|
| DE | 1 139 974 | 11/1962 |
| DE | 2 837 526 | 3/1980 |
| EP | 0 429 672 | 12/1990 |
| GB | 807589 | 1/1959 |
| JP | 60170652 | * 9/1985 |
| JP | 04114022 | * 4/1992 |
| WO | WO-98/47940 | 10/1998 |
| WO | WO-00/20204 | 4/2000 |
| WO | WO-01/40178 A1 | 6/2001 |
| WO | WO-01/66633 A1 | 9/2001 |

* cited by examiner

*Primary Examiner*—David Buttner
(74) *Attorney, Agent, or Firm*—Dority & Manning, P.A.

(57) ABSTRACT

Multiblock copolymers are described and contain the structural unit of formula I $$-A-O-R^1-O-CO-(R^2-CO-)_m-X-D-X-\\(CO-R^2)_m-CO-X- \quad (I),$$

where A is a radical derived from a homo- or copolyoxymethylene,
$R^1$ is an alkylene radical-having at least two carbon atoms or a cycloalkylene radical,
$R^2$ is a direct carbon-carbon bond, or an alkylene, cycloalkylene, arylene, or aralkylene radical,
X is selected from —O—, —S—, or —NH—,
D is a divalent radical B which is a radical of a hydroxy-terminated, mercaptan-terminated, or amino-terminated polymer which derives from polyalkylene glycols, polyvinyl ethers, polyvinyl ether-alkene copolymers, polyvinyl esters, polyvinyl ester-alkene copolymers, polyvinyl alcohols, polyvinyl alcohol-alkene copolymers, polyvinylaromatics, polyacrylates, polymethacrylates, polyacetals, polycarbonates, polyesters, polyamides, polyimines, polyetherester elastomers, polyetheramide elastomers, polyalkadienes, polyurethanes, polyureas, polysiloxanes, or a triblock copolymer radical -PAO-B-PAO-, where B assumes one of the above meanings and PAO is a polyalkylene oxide radical, and
m is 0 or 1.
The multiblock copolymers may be used to produce moldings.

23 Claims, No Drawings

POLYOXYMETHYLENE MULTI-BLOCK COPOLYMERS, THEIR PRODUCTION AND USE

RELATED APPLICATIONS

This application is a national stage application (under 35 U.S.C. 371) of PCT/EP2004/009810 filed Sep. 3, 2004 which claims benefit to German application 103 40 976.9 filed Sep. 5, 2003.

The present invention relates to novel multiblock copolyoxymethylenes, and also to their preparation and use, in particular as molding composition for injection molding and extrusion to produce moldings of any type.

Polyoxymethylene (also termed "POM" below) is a high-performance polymer with good mechanical properties. However, its toughness is unsatisfactory, and impact modifiers are therefore added to POM in some applications. Elastomeric polyurethanes are examples of these.

There have been previous attempts to influence the impact resistance of POM via controlled incorporation of co-components.

JP-A-2001-114,980 discloses that hydroxy-terminated POM can be modified with isocyanates and can be processed with polyethylene glycol to give a block copolymer linked by way of polyurethane groups.

U.S. Pat. No. 4,808,689 describes the preparation of polyurethane polyacetal elastomers, dihydroxy-terminated homopolyacetals being reacted with an alkylene diisocyanate to give an isocyanate-terminated polymer, which is then further reacted with a dihydroxy-terminated copolyacetal.

Macromol. Synth., 4, (1972), 1-6 discloses copolymers composed of polyoxymethylene blocks and of polypropylene adipate blocks, linked by way of urethane groups.

Other polyacetal polyurethane block copolymers are described in J. Appl. Polym. Sci., 31, (1986), 123-133.

US-A-2002-16,395 describes polyacetal block copolymers of ABA type. Polyacetal copolymer segments A are combined here with segments B derived from hydrogenated polybutadiene. The linkage of the blocks takes place by way of selected alkyleneoxy groups. The molar masses of the polyacetal block copolymers described are in the range from 10000 to 500 000 g/mol. Moldings composed of these polyacetal block copolymers feature high abrasion resistance and good dimensional stability.

POM preparation processes hitherto polymerize suitable monomers cationically, examples being 1,3,5-trioxane and 1,3-dioxolane. This process does not permit preparation of copolymers with very high molecular weights and correspondingly low melt viscosities. Conventional processes can typically prepare homo- and copolyoxymethylenes whose melt index (MVR value 190° C./2.16 kg, ISO 1133) is not below 1 cm³/10 min.

Production of high-molecular-weight polymers via use of chain-linking agents is in principle known.

Chain-linkage of polyamides or of polyesters or of polyesteramide block copolymers is known from WO-A-98/47,940, the chain-linking agent used here comprising a selected N,N'-carbonylbis(lactamate). WO-A-01/40,178 and WO-A-01/66,633 describes similar processes. According to this latter specification, chain-linkage can be applied to polyamides, polyesters, polycarbonates, and polyether polyols. Polyoxymethylene is also mentioned alongside polyethylene glycol or polytetramethylene glycol as an example of polyether polyols.

Finally, DE-A-2,837,526 discloses a process for preparation of polymers having diphenol carbonate end groups. This process involves, inter alia, reacting polyetherdiols of moderate molecular weight with bisaryl esters of carbonic acid and With diphenols.

Starting from this prior art, the present invention provides novel block copolymers.

The invention is based on the discovery that selected homo- or copolyoxymethylenes which are hydroxy-terminated using specific end groups can react with selected chain-linking agents and with selected polymers to give multiblock copolymers.

Processes have moreover been found permitting chain-linkage of homo- and copolyoxymethylenes with high melt index values, together with selected polymers, giving multiblock copolymers.

The invention provides multiblock copolymers containing the structural unit of formula I

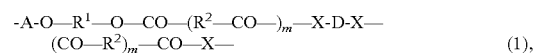
$$-A-O-R^1-O-CO-(R^2-CO-)_m-X-D-X-$$
$$(CO-R^2)_m-CO-X- \quad (1),$$

where A is a radical derived from a homo- or copolyoxymethylene, $R^1$ is an alkylene radical having at least two carbon atoms, or a cycloalkylene radical, $R^2$ is a direct carbon-carbon bond, or an alkylene, cycloalkylene, arylene, or aralkylene radical, X is selected from —O—, —S—, or —NH—, D is a divalent radical B, which is a radical of a hydroxy-terminated, mercaptan-terminated, or amino-terminated polymer which derives from polyalkylene glycols, from polyvinyl ethers, from polyvinyl ether copolymers with alkenes, from polyvinyl esters, from polyvinyl ester copolymers with alkenes, from polyvinyl alcohols or from polyvinyl alcohol-alkene copolymers, from polyvinylaromatics, from polyacrylates, from polymethacrylates, from polyacetals which have no, or up to 50 mol % of, oxymethylene units, from polycarbonates, from polyesters, from polyamides, from polyimines, from polyetherester elastomers (PEE), from polyetheramide elastomers (PEA), from polyalkadienes which may, where appropriate, have been hydrogenated, from polyurethanes, from polyureas or from polysiloxanes, or is a hydroxy-terminated triblock-copolymer radical -PAO-B-PAO-, where B assumes one of the above meanings and PAO is a polyalkylene oxide radical, and m is 0 or 1.

For the purposes of this description, an alkylene radical is a divalent branched or straight-chain aliphatic radical. Alkylene radicals can also contain heteroatoms and/or radicals inert under the conditions of preparation and processing, these having been incorporated into the main alkylene chain, or can contain inert radicals which are substituents of the main chain.

Examples of inert radicals incorporated into the main alkylene chain are arylene radicals, such as ortho-, meta-, or preferably para-phenylene radicals, cycloalkylene radicals, such as cyclohexylene, or heteroatoms, such as nitrogen N-substituted with monovalent organic radicals, silicon substituted with monovalent organic radicals, other examples being sulfur or in particular oxygen. The expression "inert radicals incorporated into the main alkylene chains" means that the inert radicals have been incorporated into the main chain but not at its ends.

Examples of substituents of the main alkylene chain are alkyl, cycloalkyl, aryl, or aralkyl radicals, or inert groups or atoms covalently bonded to the main alkylene chain. Among these are halogen atoms, such as chlorine, alkoxy groups, such as methoxy or ethoxy, aryl groups, such as phenyl, or aralkyl groups, such as benzyl.

For the purposes of this invention, the molar masses of alkylene radicals are up to 1000 g/mol, preferably from 14 to 500 g/mol.

Alkylene radicals $R^1$ must have at least two carbon atoms, whereas alkylene radicals $R^2$ can also have one carbon atom.

For the purposes of this description, a cycloalkylene radical is a divalent cycloaliphatic radical which usually contains from five to eight carbon atoms. Cycloalkylene radicals preferably have from five to six ring-carbon atoms, and can contain further groups which are inert under the conditions of preparation and processing, e.g. halogen atoms, such as chlorine, alkyl groups, such as methyl or ethyl, alkoxy groups, such as methoxy or ethoxy, aryl groups, such as phenyl, or aralkyl groups, such as benzyl.

For the purposes of this description, an arylene radical is a divalent aromatic hydrocarbon radical, usually containing from six to fourteen carbon atoms. Arylene radicals are preferably phenylene or naphthylene radicals, and can contain further groups which are inert under the conditions of preparation and processing, e.g. halogen atoms, such as chlorine, alkyl groups, such as methyl or ethyl, alkoxy groups, such as methoxy or ethoxy, aryl groups, such as phenyl, or aralkyl groups, such as benzyl.

For the purposes of this description, an aralkylene radical is a divalent araliphatic radical which usually contains from seven to ten carbon atoms. Benzylidene is preferred. Aralkylene radicals can contain further groups which are inert under the conditions of preparation and processing, e.g. halogen atoms, such as chlorine, alkyl groups, such as methyl or ethyl, alkoxy groups, such as methoxy or ethoxy, aryl groups, such as phenyl, or aralkyl groups, such as benzyl.

For the purposes of this description, an alkyl radical is a monovalent branched or straight-chain aliphatic radical which usually contains from one to fifty, preferably from one to thirty, and particularly preferably from one to ten, carbon atoms. Alkyl radicals can contain further groups which are inert under the conditions of preparation and processing, these being monovalent substituents or having been incorporated into the main chain. Examples of these have been listed at an earlier stage above during the description of the alkylene radicals. Preferred examples of substituents are halogen atoms, such as chlorine, alkoxy groups, such as methoxy or ethoxy, aryl groups, such as phenyl, or aralkyl groups, such as benzyl.

For the purposes of this description, a cycloalkyl radical is a monovalent cycloaliphatic radical which usually contains from five to eight carbon atoms. Cycloalkyl radicals preferably contain from five to six ring-carbon atoms, and can contain further groups which are inert under the conditions of preparation and processing, e.g. halogen atoms, such as chlorine, alkyl groups, such as methyl or ethyl, alkoxy groups, such as methoxy or ethoxy, aryl groups, such as phenyl, or aralkyl groups, such as benzyl.

For the purposes of this description, an aryl radical is a monovalent aromatic hydrocarbon radical which usually contains from six to fourteen carbon atoms. Aryl radicals are preferably phenyl or naphthyl, and can contain further groups which are inert under the conditions of preparation and processing, e.g. halogen atoms, such as chlorine, alkyl groups, such as methyl or ethyl, alkoxy groups, such as methoxy or ethoxy, aryl groups, such as phenyl, or aralkyl groups, such as benzyl.

For the purposes of this description, an aralkyl radical is a monovalent araliphatic radical which usually contains from seven to ten carbon atoms. Benzyl is preferred. Aralkyl radicals can contain further groups which are inert under the conditions of preparation and processing, e.g. halogen atoms, such as chlorine, alkyl groups, such as methyl or ethyl, alkoxy groups, such as methoxy or ethoxy, aryl groups, such as phenyl, or aralkyl groups, such as benzyl.

The inventive multiblock copolymers contain radicals A derived from homo- or copolyoxymethylenes, and contain radicals D derived from selected polymers, linked to one another by means of specific chain-linking agents.

The radicals A are homo- or copolyoxymethylenes which are intended for chain-linkage and whose unstable end groups have been removed. At each end of a radical A there are carbon atoms which bear end groups or which have linkage to a radical D or to another radical A by way of chain-linking agent.

The content of the radicals A derived from homo- or copolyoxymethylenes in inventive multiblock copolymers can vary widely and is usually from 10 to 99% by weight, preferably from 50 to 90% by weight, based on the inventive multiblock copolymers.

The content of the radicals D derived from selected polymers in the inventive multiblock copolymers can likewise vary widely and is usually from 1 to 90% by weight, preferably from 10 to 50% by weight, based on the inventive multiblock copolymers.

The remaining structural units, alongside the blocks A and D, of the inventive multiblock copolymers derive from the chain-linking agents used and also from the end groups of the homo- or copolyoxymethylenes used for the chain-linkage reaction —O—$R^1$—OH, and, if appropriate, contain other structural units, for example end groups other than —O—$R^1$—OH, e.g. alkoxy groups, for example methoxy, ethoxy, propoxy, or butoxy, or ester groups, such as formate or acetate.

The polyoxymethylene radicals A ("POM radicals") are generally unbranched linear blocks which generally contain, based on the radical A, at least 50 mol %, preferably at least 80 mol %, in particular at least 90 mol %, of oxymethylene units (—$CH_2$—O—).

The molecular weights of the POM radicals A in the inventive copolymers can vary widely. These radicals typically have repeat structural units of the formula —($CH_2$—O—)$_x$, where x is from 100 to 10 000, preferably from 300 to 3000.

The expression polyoxymethylene radicals here encompasses not only radicals derived from homopolymers of formaldehyde or of its cyclic oligomers, for example of trioxane or of tetraoxane, but also copolyoxymethylene radicals.

Copolyoxymethylene radicals are polymer components which derive from formaldehyde or from its cyclic oligomers, in particular from trioxane, and from cyclic ethers, from aldehydes, such as esters of glyoxylic acid, from cyclic acetals which, if appropriate, can have substitution, and/or from linear oligo- or polyacetals.

The preparation of these homo- or copolyoxymethylene radicals is known per se to the person skilled in the art and described in the literature. These polymer radicals very generally contain at least 50 mol % of —$CH_2$—O— repeat units in the main polymer chain.

The homopolymer radicals generally derive from formaldehyde or trioxane via polymerization, preferably in the presence of suitable catalysts.

Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan, and 1,3,6-trioxocane as cyclic ethers, and also of linear oligo- or polyformals, such as polydioxolane or polydioxepan, as cocomponents.

Preference is given to copolyoxymethylenes A in which polyoxymethylene radicals having from 99.9 to 90 mol % of repeat structural units of the formula $—(CH_2—O—)_x$, preferably derived from trioxane, and from 0.1 to 10 mol % of repeat structural units derived from one of the above mentioned comonomers are present.

Particular preference is given to copolyoxymethylenes A in which polyoxymethylene blocks having from 99.9 to 90 mol % of repeat structural units of the formula $—(CH_2—O—)_x$, preferably derived from trioxane, and from 0.1 to 10 mol % of repeat structural units of the formula

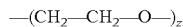

where z is a whole number which is at least 1.

Other suitable POM radicals A are repeat structural units which by way of example are prepared via reaction of trioxane and of one of the cyclic ethers described above, with a third monomer, preferably a bifunctional compound of the formula

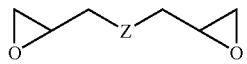

where Z is a chemical bond, —O—, or —O—$R^3$—O— ($R^3$=$C_2$-$C_8$-alkylene or $C_2$-$C_8$-cycloalkylene).

Preferred monomers of this type are ethylene diglycide, diglycidyl ether, and diethers composed of glycidyl compounds and formaldehyde, dioxane or trioxane in a molar ratio of 2:1, and also diethers composed of 2 mol of glycidyl compound and 1 mol of an aliphatic diol having from 2 to 8 carbon atoms, e.g. the diglycidyl ethers of ethylene glycol, 1,4-butanediol, 1,3-butanediol, 1,3-cyclobutanediol, 1,2-propanediol, and 1,4-cyclo-hexanediol, to mention just a few examples.

The homo- or copolyoxymethylenes A are substantially linear and contain at least 50%, preferably from 60 to 100%, of end groups of the formula —O—$R^1$—OH, where $R^1$ is as defined at an earlier stage above.

Very small amounts of branching agents can be used, if desired. The amount of branching agents is usually not more 1% by weight, based on the total amount of monomer used to prepare the POM radicals A, preferably not more than 0.3% by weight.

$R^1$ derives from an aliphatic or cycloaliphatic diol HO—$R^1$—OH.

$R^1$ is preferably a radical of the formula —$C_nH_{2n}$—, where n is a whole number from 2 to 6. Particularly preferred radicals $R^1$ are —$(CH_2)_4$—, —$(CH_2—CH(CH_3))$—, —$(CH_2—CH_2—O)_x$—$CH_2$—$CH_2$—, and very particularly preferably —$CH_2$—$CH_2$, where x is a whole number from 1 to 20.

The end groups —O—$R^1$—OH can be produced during preparation of the POM starting compounds via addition of diols HO—$R^1$—OH to the polyacetal-forming monomer(s), the end groups —O—$R^1$—OH being formed here via chain transfer. Instead of this, a copolyoxymethylene containing —O—$R^1$—O— units can be degraded via solution hydrolysis, e.g. in methanol/water with triethylamine, or via melting hydrolysis, e.g. via thermal degradation in an extruder, thus producing —O—$R^1$—OH end groups.

According to the invention, the homo- or copolyoxymethylene starting products of the structure $R^4$-A-O—$R^1$—OH, where A is defined as above and $R^4$ is an end group, preferably —O—$R^1$—OH, are linked together with polymers of the structure HX-D-XH, where D and X are defined as above, by way of selected chain-linking agents which form the structural element —X—CO—$(R^2—CO—)_m$—X—.

$R^4$ can be any desired end groups of homo- or copolyoxymethylenes. Examples of these are groups of the formulae —OH, —O—$R^5$, —O—CO—$R^6$, or in particular groups of the formula —O—$R^1$—OH, where $R^1$ is as defined at an earlier stage above, $R^5$ is an alkyl, cycloalkyl, aryl, or aralkyl radical, and $R^6$ is hydrogen or an alkyl, cycloalkyl, aryl, or aralkyl radical.

The inventive multiblock copolymers contain, alongside the radicals A, radicals D, bonded to the radicals A by way of selected chain-linking agents.

The radicals D derive from selected hydroxy-, mercaptan- or amino-terminated polymers defined as above. The polymer starting materials typically have molar masses (number-average) above 1000 g/mol.

These polymers can be of various chemical species, for example can be hydrocarbon radicals or polysiloxane radicals, and these radicals in turn can contain ether or ester groups in the main chain and/or any side chains present, therefore by way of example being polyalkylene oxide radicals.

These polymers can be unsubstituted or can have substitution by additional radicals. These substituents can be inert, i.e. unreactive under the conditions of preparation of the inventive block copolymer, or can be reactive and serve as a starting point for formation of further chain-linkages with POM blocks. In the latter case, the products are branched/crosslinked inventive multiblock copolymers.

Examples of inert substituents are alkyl, cycloalkyl, aryl or aralkyl groups, and also alkoxy groups or halogen atoms.

Examples of reactive substituents are hydroxy groups.

Polymers that can be used for forming the blocks D are polyalkylene glycols, such as polyethylene glycol, polypropylene glycol or polytetramethylene glycol; polyvinyl ethers having free hydroxy groups, for example partially hydrolyzed polyvinyl ethyl ethers, polyvinyl methyl ethers, or polyvinyl isobutyl ethers, partially hydrolyzed polyvinyl ether copolymers with alkenes, e.g. polyvinyl methyl ether-ethylene copolymer, partially hydrolyzed polyvinyl esters, such as polyvinyl acetate, partially hydrolyzed polyvinyl ester copolymers with alkenes, e.g. polyvinyl acetate-ethylene copolymers, polyvinyl alcohols or polyvinyl alcohol-alkene copolymers, polyvinylaromatics terminated by hydroxy groups, polyacrylates terminated by hydroxy groups, polymethacrylates terminated by hydroxy groups, polyacetals terminated by hydroxy groups and having no oxymethylene groups or having up to 50 mol % of oxymethylene groups, polycarbonates terminated by hydroxy groups, aliphatic, aliphatic-aromatic, or else fully aromatic polyesters terminated by hydroxy groups, e.g. polybutylene terephthalate or polyethylene terephthalate; polyether ester elastomers (PEE) terminated by hydroxy groups, polyamides terminated by amino groups, polyimines terminated by amino groups, polyetheramide elastomers (PEA) terminated by hydroxy groups or by amino groups, polyalkadienes terminated by hydroxy groups or their hydrogenated derivatives, e.g. polybutadiene or hydrogenated polybutadiene; polyureas and polyurethanes terminated by hydroxy groups; or polysiloxaries, such as polydialkylsiloxanes, in particular polydimethylsiloxanes. Instead of these hydroxy-terminated polymers, it is possible to use the corresponding mercaptan- or amino-terminated polymers.

A further, and preferred, group of polymers for forming the blocks D is provided by triblock copolymer radicals -PAO-B-PAO- terminated by hydroxy groups. B here complies with one of the above definitions, i.e. derives from the polymers listed above, and PAO is a polyalkylene oxide radical, preferably a polytetramethylene glycol, polypropylene glycol, or in particular polyethylene glycol radical.

These triblock copolymers are disclosed in WO-A-01/0474. For the purposes of the present invention, the component D used comprises these triblock copolymers whose molar mass exceeds 1000 g/mol.

X is preferably —O—, meaning that the blocks D preferably derive from hydroxy-terminated polymers.

Preferred blocks D derive from polymers which have hydroxy end groups and which are selected from the group consisting of polyethers, polyesters, polyetheresters, polyetheramides, polyurethanes, or which are triblock copolymers derived from non-hydrogenated or hydrogenated polyalkadiene which has been linked at both ends to a poly(alkylene oxide) block.

Particularly preferred blocks D derive from polyalkylene oxides. Examples of these are polyethylene oxide (PEO), polypropylene oxide (PPO), polytetramethylene glycol, and also copolymers containing these units in random sequence or in the form of blocks, e.g. block copolymers of PEO-PPO-PEO type.

Other particularly preferred blocks D derive from polyesters. Examples of these are aliphatic polyesters, such as polyethylene adipate or polyethylene sebacate, or polylactones, such as poly-ε-caprolactone.

Other particularly preferred blocks D derive from vinylaromatic polymers. One example of these is polystyrene terminated by hydroxy groups.

Other particularly preferred blocks D derive from polyacrylates or -methacrylates whose end groups have been functionalized with amino or mercaptan, or in particular with hydroxy, groups.

Other particularly preferred blocks D derive from polyamides. Examples of these are aliphatic polyamides, such as polyhexamethyleneadipamide or polyhexamethylenesebacamide, or polylactams, such as poly-ε-capro-lactam, or else from the corresponding polyimines, which can be obtained via hydrogenation of these polyamides.

Particularly preferred PAO-B-PAO triblock copolymers are radicals of PEO-Pol-PEO type, where Pol is non-hydrogenated or hydrogenated poly-butadiene, non-hydrogenated or hydrogenated polyisoprene, or polyiso-butylene or polydimethylsiloxane.

Without commitment to any one theory, it is assumed that these oligomers or polymers are linked to the POM blocks by way of chain-linkage reactions.

According to the invention, blocks A and D have been linked by way of selected chain extenders which form the structural element —$R^1$—O—CO—($R^2$—CO—)$_m$—X—.

Instead of linkage of the blocks A and D ("AD linkage), it is also possible that any desired other combinations of blocks can form, examples being AAD, ADD, ADAD, MAD, ADAA, ADDA, AADD or others, which in the case of AD linkage or AA linkage have been coupled to one another by way of the structural element —$R^1$—O—CO—($R^2$—CO—)$_m$—X—, and in the case of DD linkage have been coupled to one another by way of the structural element —X—CO—($R^2$—CO—)$_m$—X—.

There may also be unreacted constituents of the reaction mixture present, for example HX-D-XH and/or $R^4$-A-O—$R^1$—OH, alongside the block copolymers.

The chain-linking agents are derivatives of carbonic acid, e.g. esters of carbonic acid, or activated urea derivatives, or esters or half-esters of dicarboxylic acids, or dianhydrides of tetracarboxylic acids. A factor to be considered in selection of the chain-linking agents is that these have at least some solubility in the reaction mixture under the conditions of processing or reaction, and are therefore available for a chain-linkage reaction. For the purposes of this description "sufficiently soluble" means solubility of at least 1 mmol/kg.

Preference is given to diesters of aromatic or aliphatic dicarboxylic acids, or in particular to diesters of carbonic acid, diaryl esters being very particularly preferred.

One preferred example of a diaryl ester of carbonic acid is diphenyl carbonate.

Preference is likewise given to diesters of oxalic acid, in particular the diphenyl ester or the dimethyl ester.

Preferred examples of diesters of aromatic dicarboxylic acids are diphenyl esters or dimethyl esters of isophthalic acid or of terephthalic acid.

Preferred examples of diesters of aliphatic dicarboxylic acids are diphenyl esters or dimethyl esters of adipic acid or of sebacic acid.

One preferred example of a dianhydride of tetracarboxylic acids is oxybis(phthalic anhydride).

One preferred example of an activated urea derivative is carbonyl N,N'-bis(caprolactamate).

Preference is given to multiblock copolymers where $R^1$ is —$CH_2$—$CH_2$—.

Preference is likewise given to multiblock copolymers where m=0.

Preference is likewise given to multiblock copolymers where m=1 and $R^2$ is a phenylene radical or a radical of the formula —$C_rH_{2r}$— or a chemical bond, where r is a whole number from one to ten.

Preferred components for forming the blocks D are hydroxy-terminated polybutadienes and in particular hydroxy-terminated polyalkylene glycols, in particular the polyethylene glycols, and also block copolymers or random copolymers having polyethylene oxide units and having polypropylene oxide units.

Particular preference is given to block copolymers where D is a radical —($CH_2$—$CHR^7$)$_q$—, which, where appropriate, can also contain co-units derived from alkenes, in particular from ethylene or propylene, where $R^7$ is a group —O—$R^8$ or —O—CO—$R^8$, $R^8$ is hydrogen or an alkyl, cycloalkyl, aryl, or aralkyl radical, in particular a methyl or ethyl radical, and q is a whole number from 2 to 5 000, where some of the radicals $R^7$ may also be —O— bonded to further blocks A.

Preference is also given to multiblock copolymers where D is a radical —($C_sH_{2s}$—O—)$_t$, s is a whole number from 2 to 12, and t is a whole number from 6 to 25 000, preferably from 20 to 1000.

Further preference is given to multiblock copolymers where D derives from hydroxy-terminated polyesters, preferably from aliphatic polyesters or from aliphatic/cycloaliphatic polyesters. Examples of these are polyesters derived from ethylene glycol, propylene glycol, butylene glycol, or cyclo-hexanedimethanol as alcohol components, and from adipic acid or sebacic acid as acid components, or from polylactones, such as poly-ε-capro-lactone.

Preparation of the inventive multiblock copolymers is based on the discovery that homo- or copolyoxymethylenes having selected end groups can be reacted together with selected polymers in the presence of selected chain-linking agents, and using selected catalysts, to give multiblock copolymers.

The invention also provides a process for preparing multi-block copolymers encompassing the reaction of homo- or copolyoxymethylenes of the formula II with homo- or copolymers of the formula III, and with at least one chain-linking agent of the formula IV $$R^4\text{-A-O}—R^1—OH \quad (II),$$

$$HX\text{-D-}XH \quad (III),$$

$$R^9—CO—(R^2—CO—)_m—R^{10} \quad (IV),$$

where A, D, X, $R^1$, $R^2$, $R^4$, and m are defined as above, and $R^9$ and $R^{10}$ independently of one another are alkoxy, cycloalkoxy, aryloxy, aralkyloxy, or the radical of a lactam bonded via the nitrogen atom, or, in the case where m=1, $R^9$ and $R^{10}$ together with another carboxylic acid group of the radical $R^2$ form an anhydride group or an imide group.

The chain-linkage reaction is usually carried out in the presence of catalysts which promote the formation of covalent bonds between the end groups —O—$R^1$—OH of the homo- or copolyoxymethylenes of the formula II and/or the end groups of the homo- or copolymers of the formula III and the chain-linking agent of the formula IV. These are Lewis acids or Lewis bases.

Typical catalysts which can be used according to the invention are compounds which catalyze transesterification reactions or catalyze the formation of ester groups.

According to the invention, the amounts used of these catalysts are from 0.1 ppm to 10 000 ppm, in particular from 1 ppm to 1000 ppm, based on the reaction mixture.

Examples of suitable Lewis acid catalysts are LiX, $Sb_2O_3$, $GeO_2$, $BX_3$, $MgX_2$, $BiX_3$, $SnX_4$, $SbX_5$, $FeX_3$, $GeX_4$, $GaX_3$, $HgX_2$, $ZnX_2$, $AlX_3$, $PX_3$, $TiX_4$, $MnX_2$, $ZrX_4$, $[R_4N]_q^+ A^{q-}$, $[R_4P]_q^{30} A^{q-}$, where X can be a hydrogen atom, i.e. I, Br, Cl, F and/or an —O—R or —R group, where R is alkyl, cycloalkyl, aryl or aralkyl, q is a whole number from 1 to 3, and A is a q-valent anion, such as halide, sulfate, or carboxylate, or else sulfonium salts or titanyl compounds.

Examples of suitable Lewis-base catalysts are metal salts of carboxylic acids, preferably the alkali metal or alkaline earth metal salts, in particular the lithium salts, such as lithium versatate; or complexes of metals with acetylacetone, preferably the alkali metal complexes and alkaline earth metal complexes, in particular lithium acetylacetonate; or alkoxides or phenolates of metal salts, preferably of alkali metals or of alkaline earth metals; or tertiary amines, in particular trialkylamines or cyclic tertiary amines, such as diazabicyclo[2.2.2]octane (DABCO), dimethylaminopyridine (DMAP), guanidine, or morpholine; or organotin compounds, such as dibutyltin dilaurate, dibutyltin bis(2-ethylhexanoate), dibutyltin dibutyrate, dibutyltin dimethoxide, dibutyltin dioctanoate, or stannous ethylhexanoate.

It is also possible to use mixtures of various catalysts.

It is particularly preferable to use lithium acetylacetonate, sodium phenolate, sodium methoxide, lithium methoxide, lithium chloride, or sodium acetylacetonate.

The homo- or copolyoxymethylenes of the formula II can be prepared by processes known per se.

To this end, a monomer forming —$CH_2$—O— units or a mixture of various monomers is (co)polymerized with conventional catalysts, if appropriate, together with a solvent and/or with regulators, at a temperature of from −78° C. to 300° C., either at atmospheric pressure or at pressures up to 500 bar, for example at pressures of from 2 to 500 bar. Another possibility is anionic polymerization of formaldehyde, where O—$R^1$—OH end groups can be introduced via reaction with ethylene oxide.

Examples of monomers forming —$CH_2$—O— units have been listed at an earlier stage above.

In bulk polymerization, the polymerization mixture is fluid or solidifies in the case of polymerization at atmospheric pressure during the course of the polymerization reaction. As an alternative to this, however, operations can also be carried out in inert solvents. Examples of these are aliphatic, cycloaliphatic, halogenated aliphatic hydrocarbons, glycol ethers, or cyclic ethers, such as THF or 1,4-dioxane.

The molecular weight of the polymers of the formula II can, if appropriate, be adjusted via use of the regulators known per se in POM preparation.

Examples of regulators are dihydric alcohols of the formula HO—$R^1$—OH, where $R^1$ is as defined at an earlier stage above, and also very small amounts of water. These alcohols, or the water, can function as chain-transfer agents. The amounts usually used of the regulators are up to 50 000 ppm, preferably from 100 to 3000 ppm.

Catalysts or initiators that can be used are the cationic initiators usually used in preparation of homo- or copolyoxymethylenes. Examples of these are protic acids, such as fluorinated or chlorinated alkyl- and arylsulfonic acids, e.g. trifluoromethanesulfonic acid, trifluoromethanesulfonic anhydride, or Lewis acids, e.g. stannic tetrachloride, arsenic pentafluoride, phosphorus pentafluoride, and boron trifluoride, and also their complexes and compounds of salt type, e.g. boron trifluoride etherate and triphenylmethyl hexafluorophosphate.

The usual amounts used of the catalysts or initiators are from 0.01 to 1000 ppm, preferably from 0.03 to 100 ppm, based on the monomer (mixture).

According to the invention, pressure and temperature in the polymerization zone are to be selected in such a way that monomers and polymer have homogenous or finely dispersed distribution, preferably being completely dissolved in one another or at least being so finely distributed as to form a dispersion which still permits incorporation of the monomers. This is the case with the values stated above for the reaction pressure and the reaction temperature.

The preferred polymerization temperature is from 70 to 200° C., either at atmospheric pressure or at pressures of from 5 to 50 bar.

The polymerization time can vary widely, and is typically in the range from 0.1 to 20 minutes. The polymerization time is preferably from 0.4 to 5 minutes.

The polymerization reaction can take place in the reactors known for preparation of homo- or copolyoxymethylenes. Typical equipment used is tubular reactors designed with static mixers and permitting control of temperature and having pressure-tight design; as an alternative, the reaction can also be carried out in kneaders or extruders.

Further treatment of the polymerization mixture after the polymerization reaction takes place in a manner conventional per se. The polymerization reaction is usually followed by deactivation, devolatilization, and compounding of the mixture.

Deactivation takes place via addition of deactivators to the reaction mixture. Examples of these are ammonia, amines, alcohols, salts having basic reaction, or else water.

To introduce the —O—$R^1$—OH end groups, use can be made of copolyoxy-methylenes containing —O—$R^1$—O— groups, in which these end groups are produced via hydrolysis. This typically takes place in the context of the abovementioned deactivation in an alkaline environment or via controlled thermal degradation of terminal —($CH_2$—O)— units until a —O—$R^1$—O— unit arises.

However, the —O—R$^1$—OH end groups can be produced before preparation of the homo- or copolyoxymethylenes of the formula II is complete, by adding very small amounts of diols HO—R$^1$—OH to the polyacetal-forming monomer(s), so that the —O—R$^1$—OH end groups are produced via chain transfer and repeat structural units derived from the polyacetal-forming monomers form in the interior of the chain.

The compounds of the formulae II, III and IV can be reacted in any desired reactors, for example in stirred tanks, in static mixers, or in particular in extruders or in kneaders.

To this end, the compounds of the formulae II, III and IV are preferably introduced together with the respective catalyst individually or in the form of a mixture into the reactor, and are reacted with one another in a stream of gas and/or in vacuo.

Treatment in the stream of gas and/or in vacuo accelerates the reaction, giving a corresponding reduction in reaction times.

Gases that can be used are any of the gases which do not degrade, or do not significantly degrade, the reaction mixture. Examples of these are air or preferably inert gases, such as nitrogen or noble gases.

Preferred catalysts for the chain-linkage reaction are the alkali metal or alkaline earth metal salts of acetylacetonates, in particular lithium acetylacetonate or sodium acetylacetonate, and/or alkali metal salts of alkoxides or of phenolates, in particular sodium phenolate, sodium methoxide, or lithium methoxide, and/or lithium halides, in particular lithium chloride.

The reaction temperatures are typically above 60° C., preferably from 100 to 240° C., in particular from 150 to 220° C.

The reaction time is typically from 0.5 to 60 minutes.

The amounts selected of compounds of the formulae II, III and IV can vary widely. The amount of homo- or copolyoxymethylene of the formula II used, and also of end-functionalized homo- or copolymer HX-D-XH of the formula III used per mole of chain-linking agent of the formula IV is typically such that the content of the end groups —O—R$^1$—OH and —XH present at the start of the chain-linking process is in the range from one quarter of one mol to four mols.

The molar ratio of chain-linking agent to the entirety of the end groups present at the start of the chain-linkage reaction, these being —O—R$^1$—OH and —XH of the polymer of the formula II, is from 1:1 to 1:2.

In one embodiment of the inventive process, the reaction takes place via mixing of compounds of the formulae II, III and IV, where appropriate of the catalyst, and where appropriate of other additives, and via heat-treatment of the mixture in a stream of gas and/or in a vacuum for a period such that the desired molecular weight increase has been achieved. The temperature selected here is such that the reaction mixture is liquid or such that a liquid phase forms in the reaction mixture.

In another embodiment of the inventive process, from a mixture of compounds of the formulae II, III and IV, where appropriate with a catalyst, and where appropriate from other additives, a molded structure is produced. This is then heat-treated in a stream of gas and/or in a vacuum for a period such that the desired molecular weight increase has been achieved. The temperature selected here is such that the reaction mixture is solid.

This solid-phase reaction permits production of moldings from multiblock copolymers which have very high molecular weight and which are not processable, or processable only with difficulty, in conventional shaping devices, such as extruders.

It is, of course, also possible to use this solid-phase reaction to treat compositions in granular form comprising compounds of the formula II, III, and IV.

A feature of the inventive multiblock copolymers comprising the structural units of the formula I, when compared with the starting materials of the formulae II and III, is increased molecular weight, and this is discernible in a reduction in the melt index.

The melt indices (MVR values, 190° C./2.16 kg, ISO 1133) of the homo- or copolyoxymethylenes of the formula II used are generally more than 2 cm$^3$/10 min, preferably from 5 to 200 cm$^3$/10 min, in particular from 24 to 70 cm$^3$/10 min. The melting points of the homo- or copolyoxymethylenes of the formula II used are typically in the range from 100 to 175° C. (measured using DSC with heating rate of 10K/min).

The inventive multiblock copolymers can be used for moldings of any type, in particular for producing fibers, films, pipes, rods, or profiles.

The inventive multiblock copolymers can be processed via blow molding, injection molding, or extrusion, or molecular-weight increase can be achieved on previously shaped products.

The invention therefore also provides the use of multiblock copolymers for the abovementioned purposes.

Since the co-component in the inventive multiblock copolymers generally has an advantageous effect on the impact resistance of the products, it is not essential to use other impact modifiers, such as elastomeric polyurethanes. As a function of the intended application, however, these components can be added in particular cases. Indeed, there can be an increase in the ease of incorporation of these components into conventional homo- or copolyoxymethylenes by mixing, since the multiblock copolymers can act as compatibilizers.

The invention also provides the use of the multiblock copolymers as compatibilizers in compositions comprising homo- and/or copolyoxy-methylenes, the use of the multiblock copolymers as impact modifiers, and also compositions comprising homo- and/or copolyoxymethylenes and the multiblock copolymers.

The inventive compositions or multiblock copolymers can comprise other additives known per se, which can be added before completion of the preparation process or after the process of preparation of the polymeric precursors or of the multiblock copolymers.

Examples of additives are processing aids, such as antioxidants, acid scavengers, formaldehyde scavengers, UV stabilizers, heat stabilizers, adhesion promoters, lubricants, nucleating agents, or mold-release agents, fillers, reinforcing materials, or antistatic agents; or additives which give the molding composition a desired property, e.g. dyes and/or pigments, and/or impact modifiers, and/or additives conferring electrical conductivity; and also mixtures of these additives, but without restricting scope to the examples mentioned.

A possible method of processing the inventive multiblock copolymers is mixing of the fine-particle, for example pulverulent or granulated, components and subsequent thermoplastic processing, or mixing of the components in heatable mixing assemblies suitable for this purpose. Suitable mixing assemblies and mixing processes are described by way of example in: Saechtling, Kunststoff-Taschenbuch [Plastics handbook], Hanser Verlag, 27th edition, 1998, pp. 202-217, incorporated herein by way of reference.

Advantageous processing temperatures are usually in the range from 180 to 230° C., in particular from 190 to 210° C.

The examples below illustrate, but do not restrict, the invention. Unless otherwise stated, amounts stated here are always in parts by weight.

Characterization of POM powders used
End-group analysis of the POM powder used for the experiments below in
[mmol/kg] measured by $^1$H NMR spectroscopy in deuterohexafluoroisopropanol:

| Name | Comments | Methoxy —OCH$_3$ | Formate —OOCH | Hemiacetal —OCH$_2$OH | Glycol —OCH$_2$CH$_2$OH |
|---|---|---|---|---|---|
| POM-OH | After hydrolysis | 8.5 | 0 | 0.8 | 53 |

Characterization of chain-linking agents and catalysts used
Physical data and abbreviations for the chain-linking agents and catalysts used:

| Chain-linking agent/catalyst | Abbreviation | CAS No. | Molar mass | Melting point |
|---|---|---|---|---|
| Diphenyl carbonate | DiPhCO | 102-09-0 | 214.22 g/mol | 79-80° C. |
| Lithium acetylacetonate | Li(acac) | 18115-70-3 | 106.05 g/mol | 230° C. |

EXAMPLES K0-K16

Kneading Experiments

Kneading Experiments with Brabender Kneader for Chain-Extension of POM Multiblock Copolymers The starting materials (POM powders, stabilizers, chain-linking agents, polymeric co-component HX-D-XH, and catalyst: 50 g in total) were premixed in a plastic bag.

The barrel temperature of the kneading chamber of a Brabender PlastiCorder was set at 200° C., and a feed hopper (accessory of the Brabender kneader) was placed on the kneading chamber. As soon as the barrel temperature had reached 190° C., the powder mixture (50 g in total) was charged to the hopper while the kneader was running (40 rpm), and was then injected into the kneading chamber via an inserted displacer (wedge-shaped ram) using an applied weight of 5 kg. The mixture began to melt, and as soon as the melting process had concluded (brief reduction in torque), the feed hopper was removed and in its place the cover with flushing gas inlet and exhaust gas tube was superposed. Recording of torque then began and was terminated after a total of 60 minutes (from input of the powder mixture). Once the kneader chamber had been opened, the reaction mixture was removed for further investigation and characterization.

Tables 1a and 1b below list the formulations used, and also the results of characterization after 1 hour of kneading.

TABLE 1a

Formulations* for kneading experiments

| Experiment No. | Chain-linking agent | Amount of CLA [%]/ (mmol/kg) | Catalyst | Amount of cat. [%]/ (mmol/kg) | Polymer C | Amount of C [%] |
|---|---|---|---|---|---|---|
| K0 (comparison) | none | — | none | — | none | — |
| K1 (comparison) | DiPhCO | 1.0 (46.7) | Li(acac) | 0.02 (1.89) | None | — |
| K2 | DiPhCO | 1.0 (46.7) | Li(acac) | 0.02 (1.89) | PEO 100 000 | 5 |
| K3 | DiPhCO | 1.0 (46.7) | Li(acac) | 0.02 (1.89) | PEO 100 000 | 10 |
| K4 | DiPhCO | 1.0 (46.7) | Li(acac) | 0.02 (1.89) | PEO 100 000 | 20 |
| K5 | DiPhCO | 1.0 (46.7) | Li(acac) | 0.02 (1.89) | PEO 4000 | 2.5 |
| K6 | DiPhCO | 1.0 (46.7) | Li(acac) | 0.02 (1.89) | PEO 4000 | 5 |
| K7 | DiPhCO | 1.0 (46.7) | Li(acac) | 0.02 (1.89) | PEO 4000 | 10 |
| K8 | DiPhCO | 1.0 (46.7) | Li(acac) | 0.02 (1.89) | PPO 3000 | 2.5 |
| K9 | DiPhCO | 1.0 (46.7) | Li(acac) | 0.02 (1.89) | PPO 3000 | 5 |
| K10 | DiPhCO | 1.0 (46.7) | Li(acac) | 0.02 (1.89) | PPO 3000 | 10 |
| K11 | DiPhCO | 1.0 (46.7) | Li(acac) | 0.02 (1.89) | PEO 35 000 | 5 |
| K12 | DiPhCO | 1.0 (46.7) | Li(acac) | 0.02 (1.89) | PEO 35 000 | 10 |
| K13 | DiPhCO | 1.0 (46.7) | Li(acac) | 0.02 (1.89) | PEO 35 000 | 20 |
| K14 | DiPhCO | 1.3 (58.3) | Li(acac) | 0.02 (1.89) | PEO-r-PPO__75% EO 2500 | 5 |
| K15 | DiPhCO | 1.2 (55.6) | Li(acac) | 0.02 (1.89) | PEO-b-PPO-b-PEO__16% EO 2800 | 5 |
| K16 | DiPhCO | 0.95 (44.4) | Li(acac) | 0.02 (1.89) | PEO-b-PEB-b-PEO__36% EO 5600 | 5 |

*POM-OH powder (MVR 2.16 kg/190° C. = 41 ml/10 min) + main stabilizer system, composed of Irganox 245, Licowax C, and Mg stearate.
PEO = polyethylene oxide (average molecular weight stated as number thereafter);
PPO = polypropylene oxide (average molecular weight stated as number thereafter);
PEO-r-PPO = random copolymer composed of PEO and PPO (PEO content and average molecular weight are stated)
PEO-b-PPO-b-PEO = ABA triblock copolymer composed of PEO and PPO (PEO content and average molecular weight stated)
PEO-b-PEB-b-PEO = ABA triblock copolymer composed of PEO and poly(ethylene-co-butylene) (PEO content and average molecular weight are stated)

TABLE 1b

Characterization of products after 1 hour of kneading at 200° C.

| Experiment No. | Max. torque [Nm] | MVR after kneading [ml/10 min] | Reprecipitation loss* [%] | MVR after reprecipitation [ml/10 min] | Polymer C after reprecipitation [%]** | Coupling yield [%] |
|---|---|---|---|---|---|---|
| K0  | 0.7  | 42.3  | n.d.  | n.d.  | —    | —    |
| K1  | 14.9 | 0.26  | 1.10  | 0.64  | —    | —    |
| K2  | 16.9 | 0.25  | 2.39  | 0.75  | 3.72 | 74.4 |
| K3  | 15.4 | 0.74  | 3.93  | 1.21  | 5.91 | 59.1 |
| K4  | 12.2 | 1.44  | 14.0  | 1.30  | 10.45 | 52.3 |
| K5  | 11.2 | 0.25  | 2.27  | 0.72  | 2.37 | 94.8 |
| K6  | 10.5 | 0.84  | 2.49  | 0.95  | 4.44 | 88.8 |
| K7  | 4.6  | 5.05  | 7.92  | 4.48  | 5.32 | 53.2 |
| K8  | 11.1 | 1.2   | 5.34  | 1.81  | 0.31 | 12.5 |
| K9  | 9.7  | 1.15  | 7.39  | 0.82  | 0.90 | 18.0 |
| K10 | 2.4  | 8.37  | 10.98 | 3.40  | 1.16 | 11.6 |
| K11 | 17.6 | 0.66  | 6.20  | 0.69  | 3.42 | 68.4 |
| K12 | 16.6 | 0.74  | 6.40  | 0.34  | 6.70 | 67.0 |
| K13 | 14.4 | 0.60  | 16.1  | 0.37  | 7.88 | 39.4 |
| K14 | 13.4 | 10.9# | 3.0   | 9.2#  | 3.86 | 77.2 |
| K15 | 10.2 | 13.5# | 4.88  | 8.3#  | 1.79 | 35.8 |
| K16 | 16.6 | 3.3#  | 1.63  | 4.2#  | 4.87 | 97.4 |

*The products were dissolved in dimethylformamide at 150° C. and then cooled to room temperature, thus precipitating POM and POM block copolymer (while unreacted polymer C remains in solution). After filtration, washing, and drying, yield and, respectively, reprecipitation loss were determined.
**measured by means of $^1$H NMR spectroscopy in deuterohexafluoroisopropanol.
MVR (15 kg/190° C.)

EXAMPLES E0 to E3

Extrusion Experiments for Preparation of POM Block Copolymers

The experiments were carried out on a Berstorff ZE 25 twin-screw extruder. An MD 8 C Vacuu brand membrane pump was attached to the vacuum dome. The starting materials (POM powders, polymer D, stabilizers, chain-linking agents, and catalyst) were premixed in a Diosna R10A powder mixer, and metered into the feed zone of the extruder by way of a K-Tron Soder S210 feeder.

Tables 2a, 2b and 2c below show the formulations used and parameters for the extrusion experiments, and also the characterization results for the materials obtained.

TABLE 2b

Characterization of materials from extrusion experiments

| Experiment number | Polymer D in mixture [%] | MVR after extrusion [ml/10 min] | Polymer D after extrusion [%] | Polymer D after reprecipitation [%]* |
|---|---|---|---|---|
| E0 (comparison) | —  | 55.3 | —    | —     |
| E1 (comparison) | —  | 7.1  | —    | —     |
| E2 (comparison) | 10 | 41.2 | 10.15 | 0.43% |
| E3              | 10 | 27.2 | n.d. | 3.72% |

*measured by means of $^1$H NMR spectroscopy in deuterohexafluoro-isopropanol.

TABLE 2a

Formulations* and parameters for vacuum extrusion experiments#

| Experiment number | Catalyst | Chain-linking agent | Polymer D | Screw rotation rate [rpm] | Throughput [kg/h] | Melt temperature [° C.] | Melt pressure [bar] |
|---|---|---|---|---|---|---|---|
| E0 (comparison) | 200 ppm Li(acac) | none | none | 20-22 | 1.2 | 214 | 0 |
| E1 (comparison) | 200 ppm Li(acac) | 1.1% (51 mmol/kg) DiPhCO | none | 20-22 | 1.25 | 213 | 6 |
| E2 (comparison) | 200 ppm Li(acac) | none | 10% PEO 100 000 | 20-22 | 1.0 | 214 | <1 |
| E3 | 200 ppm Li(acac) | 1.1% (51 mmol/kg) DiPhCO | 10% PEO 100 000 | 20-22 | 1.0 | 214 | 1 |

*POM-OH powder (MVR 2.16 kg/190° C. = 41 ml/10 min) + stabilizer package, composed of Irganox 245, Licowax C, Eurelon 975, and magnesium stearate;
the pressure at the vacuum dome of the extruder was about 0.1 bar.

TABLE 2c

Further characterization of materials from extrusion experiments

| Experiment number | Charpy notch impact resistance [kJ/m$^2$] | Modulus of elasticity [MPa] | Yield stress [MPa] | Elongation [%] | Tensile stress at break [MPa] | Tensile strain at break [%] |
|---|---|---|---|---|---|---|
| E0 (comparison) | 6.6 ± 0.6 | 2859 ± 29 | 65.7 ± 0.2 | 7.3 ± 0.1 | 64.3 ± 1.6 | 11.5 ± 3.8 |
| E1 (comparison) | 10.3 ± 0.7 | 2533 ± 13 | 63.2 ± 0.1 | 10.5 ± 0.1 | 59.1 ± 1.9 | 27.6 ± 6.5 |
| E2 (comparison) | 9.6 ± 0.9 | 2119 ± 20 | 47.8 ± 0.1 | 9.5 ± 0.1 | 46.1 ± 1.1 | 16.7 ± 5.2 |
| E3 | 9.3 ± 0.3 | 2142 ± 16 | 48.4 ± 0.1 | 8.5 ± 0.1 | 43.8 ± 0.4 | 33.9 ± 2.0 |

The invention claimed is:

1. A composition comprising homo- and/or copolyoxymethylenes and multiblock copolymers containing the structural unit of formula I

-A—O—R$^1$—O—CO—X-D-X—CO—X— (I), where A is a radical derived from a homo- or copolyoxymethylene and the structural elements of —X—CO—X— derives from diesters of carbonic acid, R$^1$ is an alkylene radical having at least two carbon atoms, or a cycloalkylene radical, X is selected from —O—, —S—, or —NH—, and D is a divalent radical B which is a radical of a hydroxy-terminated, mercaptan-terminated, or amino-terminated polymer which derives from polyalkylene glycols, polyvinyl ethers, polyvinyl ether copolymers with alkenes, polyvinyl esters, polyvinyl ester copolymers with alkenes, polyvinyl alcohols, polyvinyl alcohol-alkene copolymers, polyvinylaromatics, polyacrylates, polymethacrylates, polyacetals which have from 0 to 50 mol % of oxymethylene units, polycarbonates, polyesters, polyamides, polyimines, polyetherester elastomers (PEEs), polyetheramide elastomers (PEAs), polyalkadienes which may, where appropriate, have been hydrogenated, polyurethanes, polyureas, polysiloxanes, or is a hydroxyterminated triblock copolymer radical -PAO-B-PAO-, where B assumes one of the above meanings and PAO is a polyalkylene oxide radical.

2. The composition as claimed in claim 1, wherein the structural elements of the formula —X—CO—X— derives from dimethyl or diphenyl carbonate.

3. The composition as claimed in claim 1, wherein R$^1$ is a radical of the formula —C$_n$H$_{2n}$—, where n is a whole number from 2 to 6.

4. The composition as claimed in claim 3, wherein R$^1$ is —CH$_2$—CH$_2$—.

5. The composition as claimed in claim 1, wherein the polyoxymethylene radical A has from 99.9 to 90 mol % of repeat structural units of the formula —(CH$_2$—O—)$_x$, where x is a whole number from 100 to 10,000, and from 0.1 to 10 mol % of repeat structural units which derive from ethylene oxide, from propylene 1,2-oxide, from butylene 1,2-oxide, from butylene 1,3-oxide, from 1,3-dioxane, from 1,3-dioxolane, or from 1,3-dioxepan, from 1,3,6-trioxocane, and/or from linear oligo- or polyacetals, and/or from aldehydes, and/or from cyclic acetals.

6. The composition as claimed in claim 1, wherein the polyoxymethylene radical A has from 99.9 to 90 mol % of repeat structural units of the formula —(CH$_2$—O—)$_x$, where x is a whole number from 100 to 10,000, and from 0.1 to 10 mol % of repeat structural units of the formula —(CH$_2$—CH$_2$—O—)$_z$ where z is a whole number which is at least 1.

7. The composition as claimed in claim 1, wherein X is —O—.

8. The composition as claimed in claim 1, wherein D is the radical of a hydroxy-terminated polymer which is selected from the group consisting of polyethers, polyalkadienes, polyesters, polyetheresters, polysiloxanes, polyetheramides, polyurethanes, or of triblock copolymers derived from non-hydrogenated or hydrogenated polyalkadiene which has been linked at both ends to a poly(alkylene oxide) block.

9. The composition as claimed in claim 1, wherein D is the radical of a hydroxy-terminated non-hydrogenated or hydrogenated polybutadiene, or of a hydroxyterminated polyalkylene glycol.

10. The composition as claimed in claim 1, wherein D is a radical —(C$_r$H$_{2r}$—O—)$_o$, r is a whole number from 2 to 12, and o is a whole number from 6 to 25,000, where r may vary within the various repeat units within the scope of the stated definition, so that varying units are present in a random sequence or as blocks.

11. The composition as claimed in claim 10, wherein D is a radical —(C$_r$H$_{2r}$—O—)$_o$, r is a whole number from 2 to 12, and o is a whole number from 20 to 1,000.

12. The composition as claimed in claim 1, wherein D comprises a radical —(CH$_2$—CHR$^7$)$_q$—, which, optionally may additionally contain co-unit radicals derived from alkenes, where R$^7$ is a group —O—R$^8$ or —O—CO—R$^8$, R$^8$ is hydrogen or an alkyl, cycloalkyl, aryl, or aralkyl radical, and q is a whole number from 2 to 5,000, where some of the radicals R$^7$ may also be —O— bonded to further blocks A.

13. The composition as claimed in claim 12, wherein D comprises a radical —(CH2—CHR$^7$)$_q$—, which optionally may additionally contain co-unit radicals derived from ethylene or propylene, where R$^7$ is a group —O—R$^8$ or —O—CO—R$^8$, R$^8$ is hydrogen or methyl or ethyl radical.

14. The composition as claimed in claim 1, wherein D derives from hydroxy-terminated aliphatic polyesters or from hydroxy-terminated aliphatic/cycloaliphatic polyesters, or from hydroxy-terminated aromatic polyesters.

15. A process for preparing the composition of claim 1 comprising reacting homo- or copolyoxymethylenes of the formula II with homo- or copolymers of the formula III, with at least one chain-linking agent of the formula IV

R$^4$-A—O—R$^1$—OH (II)

HX-D-XH (III),

R$^9$—CO—R$^{10}$ (IV), where

R$^4$ is a radical of the formula —OH, —O—R$^5$, —O—CO—R$^6$, or —O—R$^1$—OH, where R$^5$ is an alkyl, cycloalkyl, aryl, or aralkyl radical, R$^6$ is hydrogen or an alkyl, cycloalkyl, aryl, or aralkyl radical, and $R^9$ and $R^{10}$, independently of one another, are alkoxy, cycloalkoxy, aryloxy, aralkyloxy, or a lactam radical bonded by way of the nitrogen atom.

16. The process as claimed in claim 15, wherein the reaction takes place in the presence of a catalyst which is a Lewis acid or is a Lewis base.

17. The process as claimed in claim 15, wherein the catalyst used comprises the alkali metal or alkaline earth metal salts of acetylacetonates, and/or alkali metal alkoxides or alkali metal phenoxides and/or lithium halides.

18. The process as claimed in claim 15, wherein the reaction takes place at temperatures of from 100 to 240° C. and the reaction time is from 0.5 to 60 minutes.

19. The process as claimed in claim 15, wherein the amount used of compounds of the formula II and III, per mole of chain-linking agents of the formula IV, is such that the content of the entirety of the end groups —O—$R^1$—OH and —XH present at the start of the chain-linking process is in the range from one quarter of one mol to four mol.

20. The process as claimed in claim 15, wherein the reaction takes place at temperatures such that the reaction mixture is liquid, or such that a liquid phase forms in the reaction mixture.

21. The process as claimed in claim 15, wherein, from a mixture of compounds of the formula II, III and IV, optionally with a catalyst, and optionally from other additives, a molded structure is produced and is heated in a stream of gas and/or in a vacuum for a period such that the desired molecular weight increase has been achieved, the temperature selected being such that the reaction mixture is solid.

22. The process as claimed in claim 15, wherein the catalyst used comprises lithium acetylacetonate or sodium acetylacetonate and/or sodium methoxide, sodium ethoxide or lithium methoxide, and/or lithium halide and the reaction takes place at temperatures of from 150 to 220° C. and the reaction time is from 0.5 to 60 minutes.

23. A method for producing moldings, fibers, films, hoses, pipes, rods, or profiles comprising blow molding or injection molding the composition as claimed in claim.

* * * * *